United States Patent
Scott

[15] 3,665,444
[45] May 23, 1972

[54] MISSING CONTAINER DETECTOR HAVING INTEGRATED CIRCUIT MODULES

[72] Inventor: Hugh D. Scott, Richmond, Va.
[73] Assignee: Simplimatic Engineering Co., Lynchburg, Va.
[22] Filed: Dec. 28, 1970
[21] Appl. No.: 101,629

[52] U.S. Cl..........................................340/259, 250/223 B
[51] Int. Cl. .......................................................G08b 21/00
[58] Field of Search......................340/259, 280; 250/223 B; 356/196, 197, 198

[56] References Cited

UNITED STATES PATENTS 3,440,432 4/1969 Justis.................................250/223 B
3,472,374 10/1969 Ness et al........................340/259 UX Primary Examiner—John W. Caldwell
Assistant Examiner—Michael Slobasky
Attorney—James and Franklin

[57] ABSTRACT

A control apparatus for a missing container detector comprises a photoelectric cell mounted on a suitable frame at a control station along a conveyor belt for sensing the presence of a case at said control station, a plurality of container sensing heads, one for each lane, mounted above the conveyor belt and adapted to sense individual containers as they pass thereunder, and a control circuit for indicating when a case is missing one or more containers.

The control circuit comprises a binary counter, a switching circuit adapted to produce a count signal in response to the passage of each full row of containers under said sensing heads, a plug-in decoder adapted to provide a unique logic output upon the registration of a predetermined count in said counter, and a logic circuit operatively connected to said photoelectric cell and said decoder output and adapted as a case leaves said control station to actuate an indicating means in the absence of said unique output from said decoder. The indicating means may be an audible or visible alarm, means to eject a case, and/or means to stop the conveyor. The circuit utilizes exclusively solid state components and a variety of differently programmed plug-in decoders may be used thereby to adapt the circuit to cases having varying capacities.

16 Claims, 10 Drawing Figures

INVENTOR
HUGH D. SCOTT
BY
James & Franklin
ATTORNEY

INVENTOR
HUGH D. SCOTT
BY
*James Franklin*
ATTORNEY

INVENTOR
HUGH D. SCOTT
BY
ATTORNEY

MISSING CONTAINER DETECTOR HAVING INTEGRATED CIRCUIT MODULES

This invention relates to apparatus for inspecting cases filled with containers and detecting those cases which are missing one or more containers. More particularly the present invention relates to a control apparatus and circuit for determining whether cases moving past a control station contain a given number of containers, and providing an indication when a case having less than said given number of containers leaves said control station. The present invention relates to an improvement of the invention disclosed in copending application Ser. No. 90,620, of William R. Graff, entitled "Missing Container Detector," filed on Nov. 18, 1970 and assigned to the assignee of the present invention.

Many consumer goods, particularly foods and beverages, are today packed in individual containers such as glass bottles, jars, cans or the like. Normally such packaged goods are shipped to the retailer in cases containing a given number of containers, commonly 12 or 24. The cases are specifically designed to receive said given number of containers, often in individual partitioned compartments, and the packing thereof with full containers is often accomplished by completely automated case packing mechanisms. As a result it is not infrequent, because of machine malfunction or, in the case of hand packing, human error, that a case is passed along the production or shipping line without being completely filled with the required number of containers. Because the cases are also normally closed and sealed by automated machinery without human intervention, cases are often shipped by the manufacturer without the required number of containers therein. The frequency of such mishaps causes significant embarrassment and difficulty for all involved, particularly since the merchandise may be transferred through several parties and stored for substantial periods of time before the case is opened by the retailer for sale or, more importantly, by the ultimate consumer who buys in bulk.

The use of manual detection means to obviate this problem detracts substantially from the economies inherent in completely automated case packing machinery. Moreover, effective manual inspection is far from foolproof in that it depends totally upon the constant attention of the inspector who will normally be an unskilled laborer. Thus, human error substantially reduces the effectiveness of this method.

Automatic detecting devices for detecting missing containers in a case have been designed in the past. However, such apparatus has heretofore normally been designed only for specific applications, i.e. for use with a case of a specific size, shape and capacity and containers of a given configuration. Accordingly, often the expense involved in designing and manufacturing such apparatus for such a limited range of use is not justified by the savings in labor cost. Moreover, prior art apparatus of the type described is unduly complex, unreliable and may require frequent adjustment. Thus, the means for sensing individual containers in a case is normally geared to a particular spacing of the containers therein. If, as often happens when the cases are packed automatically, the containers in a full case are distributed slightly unevenly therein, that lack of uniformity in distribution may cause the sensors to provide an erroneous signal, resulting in a "missing container" output from the control circuitry when in fact no container is missing. In addition, prior art control circuits of this type are designed to stop the conveyor immediately upon sensing a missing container. Thus the case must be manually removed from the control station before the conveyor is again activated, a process which must be carried out with considerable care to avoid interference with the control apparatus at the control station. As a result, substantial delays and labor costs cannot be avoided.

Finally, the use of moving parts such as switches increases complexity, reduces reliability and speed and adds substantially to the time and expense involved in repair, replacement, and maintenance.

Accordingly, it is a primary object of the present invention to provide a reliable apparatus for readily detecting missing containers in cases rapidly moved along a shipping line by conveyor means or the like.

It is a further object of the present invention to provide control apparatus of the type described in which means are provided at a control station to sense the number of containers in each case passing said control station and means to provide a control signal upon passage of any case therethrough containing less than the required number of containers.

It is yet another object of the present invention to provide control apparatus of the type described including means to sense the presence of a case at said control station and in which the operative output signal for indicating a missing container is produced only after the case has fully passed beyond the control station regardless of the particular location within the case at which the container is missing.

It is still another object of the present invention to provide control apparatus of the type described which is readily adaptable to a wide variety of shapes and sizes of the cases and/or containers with which it can be used.

It is yet another object of the present invention to provide control apparatus of the type described which is designed to reliably indicate when a case is not completely full regardless of the spacing of the containers therein.

It is a further object of the present invention to design control circuitry for control apparatus of the type described which is responsive to the total number of containers within a case passing a control station.

It is still another object of the present invention to provide control circuitry of the type described which is effective to count the number of full rows of containers traversing a control station in a plurality of lanes and having means to readily adapt the circuit for operation with cases having a different number of lanes and/or rows.

It is yet another object of the present invention to design a control circuit of the type described which utilizes exclusively solid state components with no moving parts.

It is still another object of the present invention to provide control circuitry of the type described comprising solid state components which may be integrated on chips of semiconductor material to form discrete integrated circuit modules which are small, inexpensive and conveniently replaceable.

It is still a further object of the present invention to design control circuitry of the type described utilizing solid state logic modules adapted to provide rapid switching in response to the sensing of cases and individual containers at said control station, thereby to provide increased speed of operation.

To these ends, the prevent invention provides means for use with a conveyor belt or the like for sensing the presence of a case at a control station and means to sense individual containers disposed in said case as the case moves past the control station. The articles (containers) are counted and an indicator means in the form of an alarm, means to stop the conveyor and/or means to eject the case is actuated as the case passes beyond the control station. For this purpose a control circuit is provided generally comprising a switching circuit responsive to the container sensing means, a counter operatively connected to said switching circuit for receiving count signals therefrom, and a logic circuit responsive to the count in said counter and the case detect means. Means are provided for automatically resetting the counter as a case leaves the control station.

The logic circuit is designed to actuate an indicator circuit when a case leaves the control station if the count registered in the counter is less than a predetermined number. In a preferred embodiment the counter is designed to register one count for each full row of containers passing the control station, a container sensor being provided for each lane. A decoder is adapted to compare the number registered in the counter with a predetermined number and to provide an appropriate input signal to the logic circuit. As a case leaves the control station the indicator will be actuated if the number registered in the counter is less than the predetermined number. The components are all solid state and provided in modular form. Accordingly, the circuit may be adapted for cases of different sizes merely by plugging in the appropriate decoder module.

While the preferred embodiment is here disclosed for use with cases of capped bottles, it will be appreciated that the apparatus is equally useful with other types of containers or, indeed, with any articles arranged in discrete groups, the sensors being appropriately designed in accordance with the articles to be sensed.

To the accomplishment of the above, and to such other objects as may hereinafter appear, the present invention relates to a missing container detector and control circuitry therefor, all as defined in the appended claims and as described in this specification in which:

The control apparatus herein described is adapted for use with articles of packaged merchandise such as that contained in bottles, jars, cans, etc. The particular embodiment here disclosed is described for use with cases containing 12 or 24 capped bottles arranged in rows and lanes of 3 × 4 and 4 × 6, respectively. Normally such cases are packed by automated machinery with the required number of bottles and are moved along a conveyor means to be loaded for shipping.

Figure 1:
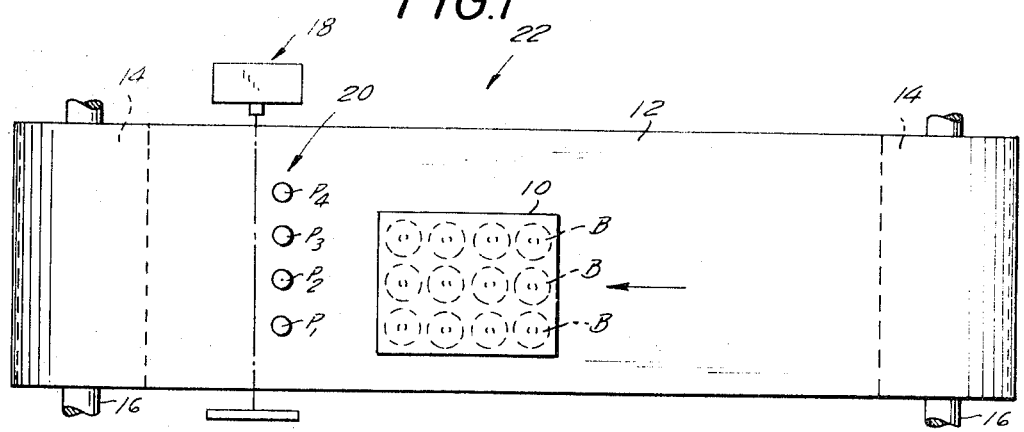
FIG. 1 is a schematic illustration of a case of bottles moving on a conveyor belt past a control station, the case containing 12 bottles.
Figure 2:
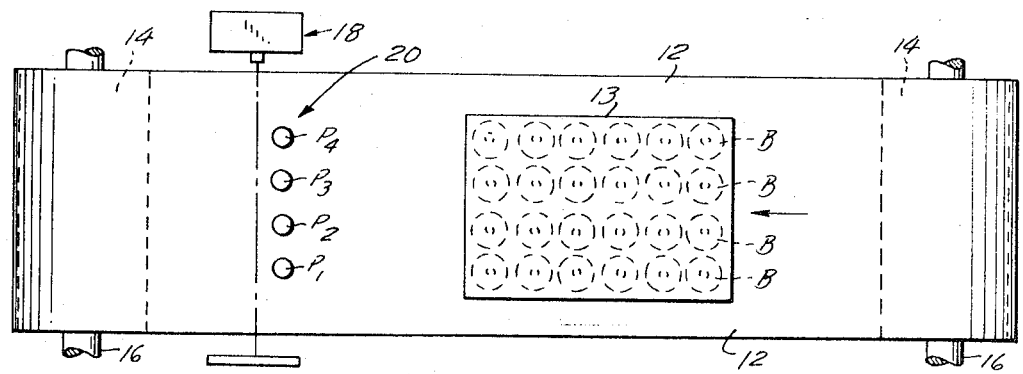
FIG. 2 is a schematic illustration similar to FIG. 1 showing a case having 24 bottles.
Figure 3:
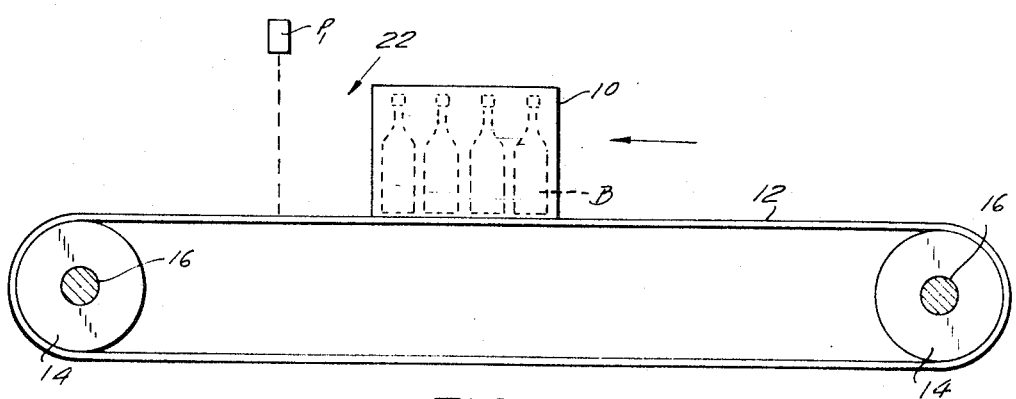
FIG. 3 is a side elevational view of the schematic illustration of FIG. 1.

FIGS. 1 and 3 schematically illustrate a case 10 containing 12 bottles B moved along a conveyor belt 12 in the direction of the arrow 14, the bottles being arranged in three lanes of four bottles each. The conveyor belt is driven through suitable means such as rolls 14 mounted on shafts 16 driven by a suitable motor (not shown). FIG. 2 shows an identical arrangement utilized with a case 13 containing 24 bottles arranged in four lanes containing 6 bottles each. In accordance with the present invention a case sensing means generally designated 18 and a bottle sensing means generally designated 20 are provided at a control station generally designated 22 positioned along conveyor belt 12. In the preferred embodiment here illustrated bottle sensing means 20 comprises four individual bottle sensors designated P1 through P4 respectively, sensor P4 being used only in connection with cases containing 24 bottles (four lanes).

CONTROL APPARATUS

Figure 4:
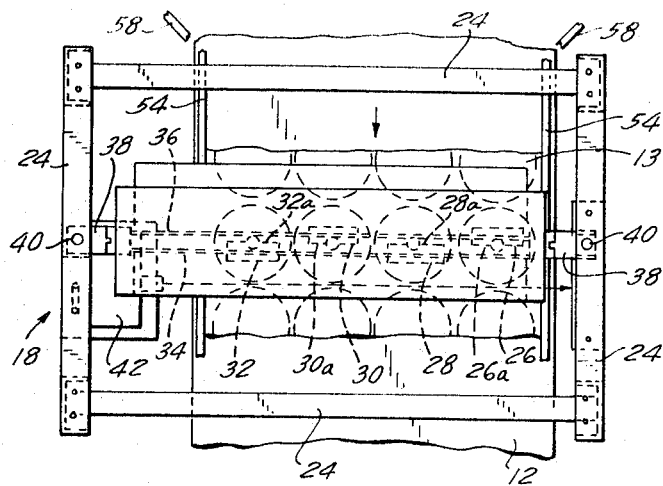
FIG. 4 is a top plan view of the control apparatus of the present invention positioned along a conveyor belt with a fragmentary view of a case of bottles passing thereunder.
Figure 5:
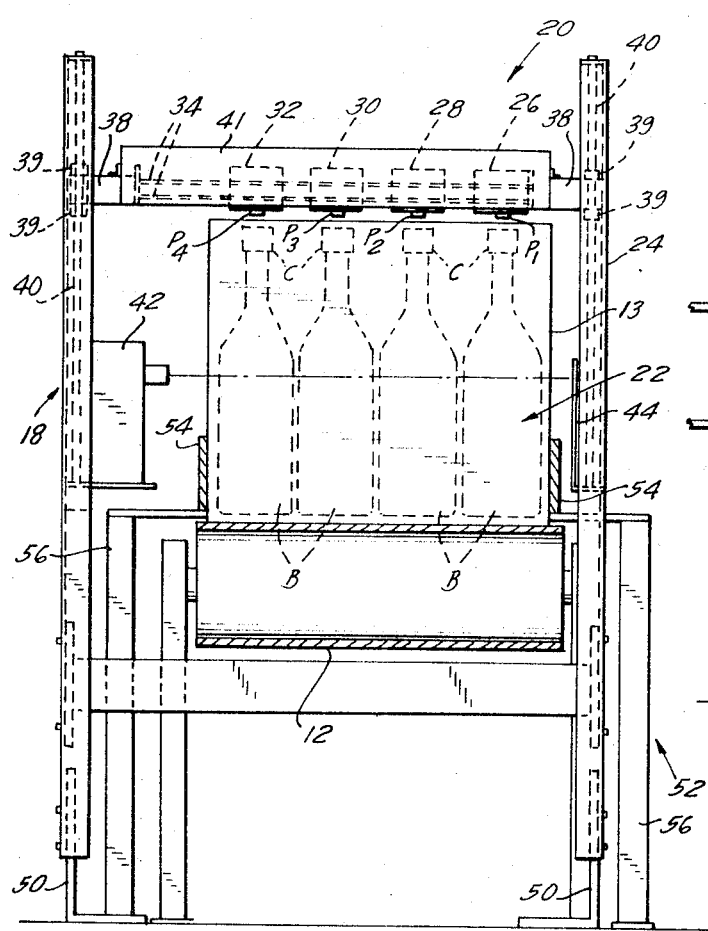
FIG. 5 is a front elevational view of the apparatus of FIG. 4.
Figure 6:
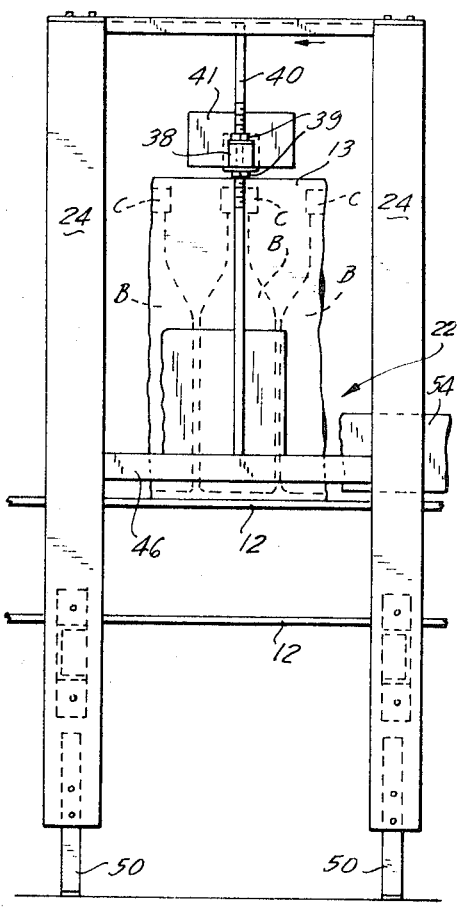
FIG. 6 is a side elevational view of the apparatus shown in FIG. 4.

Turning now to FIGS. 4–6, there is shown a detailed representation of the apparatus of the present invention. As there shown a frame generally designated 24 provides a support for both the bottle sensing means 20 and the case sensing means 18. Individual bottle sensors P1 through P4 are mounted on adjustable mounting blocks 26, 28, 30 and 32 respectively. As best shown in FIGS. 4 and 5 mounting blocks 26 through 32 are each provided with two longitudinally extending apertures and are slidably mounted by means of said apertures on two pairs of parallel support rods 34 and 36. Thus, mounting blocks 28 and 32 are mounted on rods 34 and mounting blocks 26 and 30 are mounted on rods 36, rods 34 and 36 being spaced to provide the staggered relationship illustrated in FIG. 4. The individual sensors P1-P4 are mounted in offset relationship on their respective mounting blocks such that they are in substantial alignment transverse to conveyor belt 12 as viewed in FIG. 4. The inner surfaces 26a, 30a of blocks 26 and 30 are slightly spaced from the oppositely facing inner surfaces 28a, 32a of blocks 28 and 32 to provide clearance therebetween. As a result of this arrangement sensors P1-P4 may be moved as close together as desired simply by sliding blocks 26–32 along rods 34 and 36 into overlapping relationship.

Rods 34 and 36 are mounted at either end in support blocks generally designated 38. As best shown in FIG. 6, support blocks 38 are slidably mounted on vertical adjusting rods 40 thereby providing height adjustment for the rods 34, 36 and sensor blocks 26 through 32, blocks 38 being maintained at any desired height by suitable means such as nuts 39 threadedly mounted on rods 40 (which for this purpose are externally threaded). A suitable cover 41 is provided to protect the entire bottle sensor assembly 20 from dust, dirt, etc.

As best shown in FIG. 5 case sensing mechanism 18 comprises a suitable light source generally designated 42 mounted on one side of conveyor belt 12 and a photoelectric cell in the form of a light-sensitive panel generally designated 44 mounted at the opposite side of conveyor belt 12 in opposing registration with light source 42. Both light source 42 and photoelectric cell 44 are mounted on suitable cross bars 46(FIG. 6) which in turn are mounted at either end on frame 24 by suitable means (not shown). If desired cross bars 46 may be provided with suitable means (i.e. a slot and nut) to provide height adjustment of these members on frame 24. In addition the entire frame may be height adjustable as by adjustable legs 50.

Thus the apparatus is capable of standardized manufacture, and may be installed in a given plant and readily adapted to the particular conveyor installation already in use.

In operation frame 24 is placed at the desired location along conveyor belt 24 and the bottle sensor assembly 20 is adjusted to the proper height on frame 24 and locked in position. FIG. 5 schematically illustrates case 13 containing four lanes of bottles B (i.e. a 24-bottle case) disposed in operative position under the bottle sensing assembly 20. Prior to commencing operation of the control apparatus mounting blocks 26-32 are accordingly slidingly adjusted along rods 34, 36 to bring sensing heads P1-P4 to a spacing corresponding to the lateral spacing of the bottles B within the case 13. In a preferred embodiment of the invention sensing heads P1-P4 are proximity limit switches adapted to sense the metallic caps C on bottles B. Each of these switches is in essence a temperature compensating balanced inductance bridge having two active coils. When a feromagnetic object is placed within the range of the sensor the reluctance in the flux path linking the two coils is reduced, thereby unbalancing the bridge and producing a voltage output which closes the switch contacts. Thus, if a bottle having a metal cap or foil passes under one of the switches P a contact is closed. These proximity switches with proper adjustment for sensitivity, could detect any metal-bearing article. In accordance with the present invention the sensitivity or detection range of each proximity switch P1-P4 is adjusted so that it has an extremely narrow range in the direction of movement of the conveyor. However, its range in a direction transverse to the movement of the conveyor should be broad enough to allow for slight transverse movement of the bottles within the case yet narrow enough to prevent erroneous detection of a bottle from an adjacent row. Thus, the sensing ranges should be separated sufficiently at the level of the bottle caps C so one cap cannot at the same time be sensed by two bottle sensing heads. It will be appreciated that the particular sensing apparatus here disclosed is merely by way of example and forms no part of the present invention.

In order to maintain the bottles within their respective sensing lanes as the case passes under sensing assembly 20, suitable case guide means 52 may be provided at the control station. Guide means 52 may comprise two parallel plates 54 mounted at either side of the conveyor by support means 56 and spaced from each other by a distance slightly greater than the width of case 13, said plates being flared at their inlet ends 58 for funneling cases through the control station (See FIG. 4).

CONTROL CIRCUIT

The control circuit of the present invention will now be described with reference to FIGS. 7 through 10. The operation of the circuit is generally illustrated in block diagram form in FIG. 7. As there shown the bottle sensor assembly 20 is operatively connected to a switching circuit 60. Switching circuit 60 is responsive to the input from bottle detector assembly 20 and is adapted to provide an output signal in accordance therewith, said output signal providing the input to a counter generally designated 62. In accordance with a preferred embodiment herein described, counter 62 is effective upon a case entering the control station, to register one count for each full row of bottles passing the bottle sensing assembly 20. That is, each time a bottle is sensed by all operative bottle sensing heads P as a row of bottles passes therebeneath, the bottle indicator will provide the necessary input to switching circuit 60 which in turn will provide a count signal, thereby to register one count in counter 62. A decoder generally designated 64 is operatively connected to counter 62 and is adapted to respond to a designated count registered therein. The output of decoder 64 is normally at a first logic level and will be changed to a second logic level only upon the registration of that designated count in counter 62. Decoder 64 is thus a pre-programmed circuit and in accordance with the present invention several such differently programmed decoders may be selectively connected in the circuit in accordance with the number of rows of bottles contained in a full case.

A logic circuit generally designated 66 is operatively connected to decoder 64 and case detect means 18 and is adapted in response to a signal at the output of decoder 64 at said second logic level to provide a "missing bottle" signal at its output as a case leaves the control station. Indicator actuator circuit 68 is operatively connected to logic circuit 66 and an indicator generally designated 70 and is adapted upon receipt of said "missing bottle" signal from logic circuit 66 to actuate indicator 70. The term "indicator" as used herein includes any means adapted to actuate an alarm (visible or audible), stop the conveyor, or appropriately act on the thus detected case, as by ejecting it from the conveyor line or the like.

A reset circuit generally designated 72 is operatively connected between a voltage source 74 and counter 62. A switch 76 is interposed between voltage source 74 and reset circuit 72 and is operatively connected to case detect means 18. Thus as a case leaves the control station switch 124 is effective to connect reset circuit 72 with voltage source 74 thereby to energize same and reset the counter to "0". As the next case enters the control station switch 124 is again actuated by case detect means 18, this time to disconnect reset circuit 72 from voltage source 74, thereby to enable the counter to proceed with counting. At the same time switch 124 is adapted to connect logic circuit 66 with voltage source 74 thereby to provide a logic input (voltage source 74 being at one of two logic levels) which prevents logic circuit 66 from producing a missing bottle output signal during the presence of a case at the control station. Accordingly, it is only after a case exits from the control station and the input to logic circuit 66 from source 74 is cut off by switch 124 that logic circuit 66 is enabled to produce a "missing bottle" signal output in accordance with the input from decoder 64.

It will be apparent from the foregoing that a case having one or more missing bottles (regardless of the actual number) will be detected immediately upon leaving the control station and may be appropriately acted upon without interruption of subsequent movement of cases through the control station.

Figure 7:
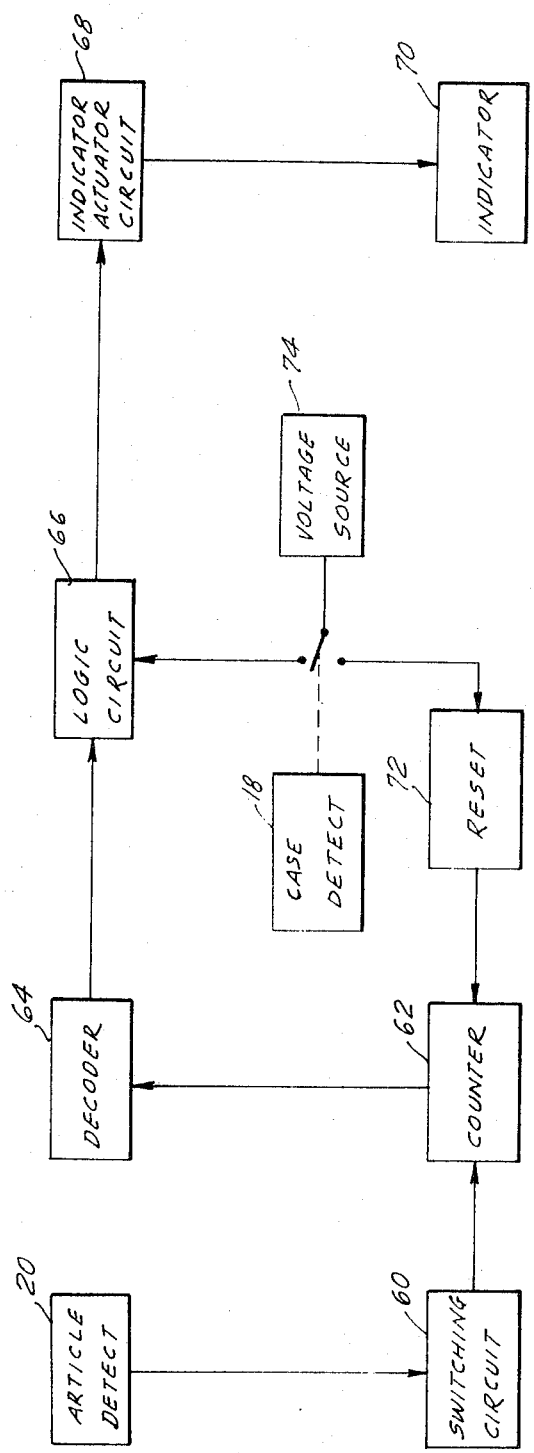
FIG. 7 is a simplified block diagram genrally showing the operation of the control apparatus of the present invention.
Figure 8:
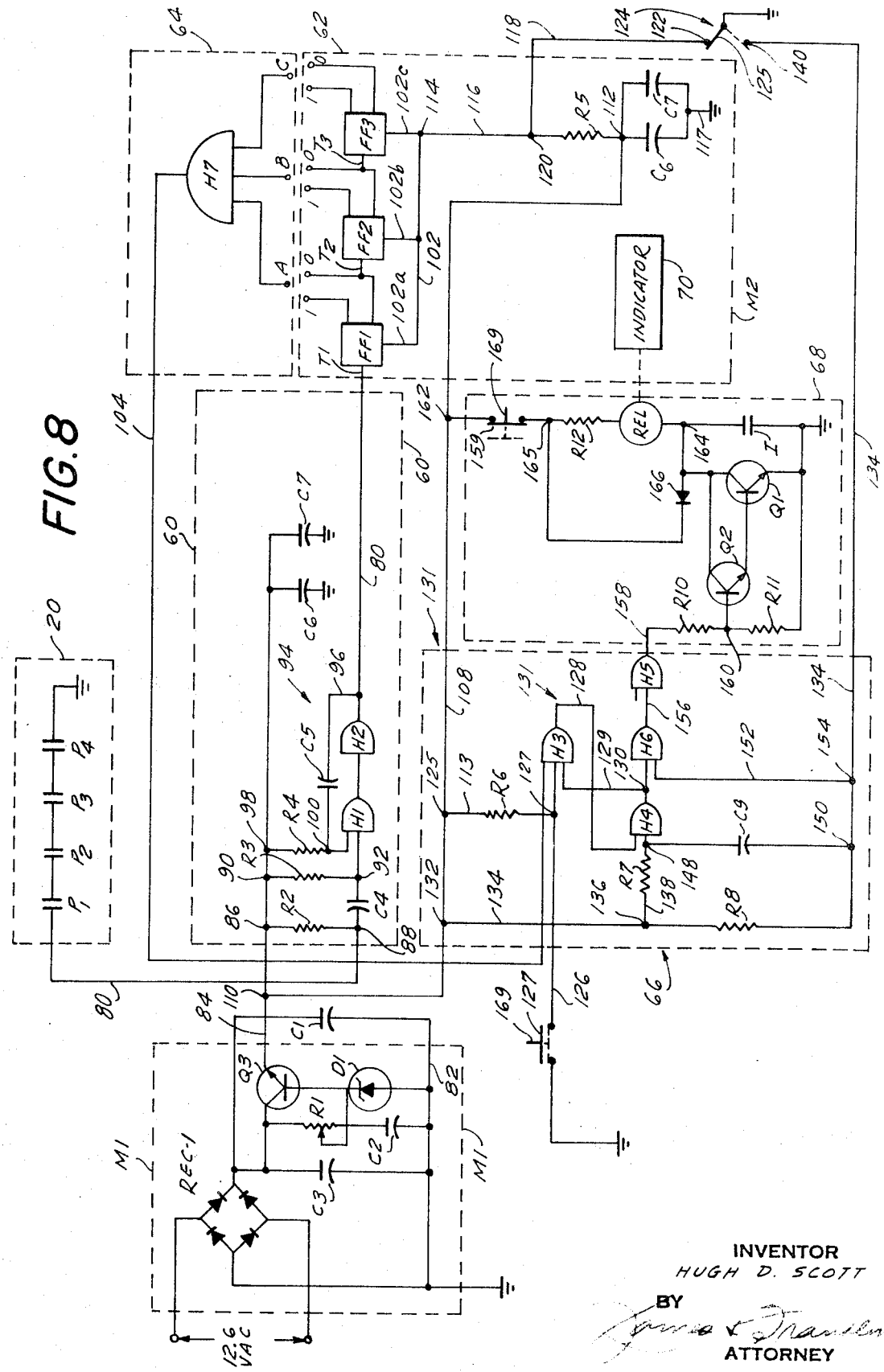
FIG. 8 is a circuit diagram of the control circuit of the present invention illustrating the operation of the present invention.

FIG. 8 is a circuit diagram of the control circuit of the present invention, the various parts of the circuit corresponding to the blocks of FIG. 7 being enclosed in correspondingly numbered broken lines. As there shown article sensing assembly 20 comprises four proximity switch contacts P1–P4 connected in series between ground and switching circuit 60 by means of lead line 80. Contacts P1–P4 are operatively connected to their corresponding sensing heads shown in FIG. 5 and are adapted to be closed each time a bottle cap enters the sensing field of its corresponding proximity switch as previously described. A power module M1 is adapted to convert a 12.6-volt A.C. input into a 15-volt D.C. output. The 12.6-volt A.C. input is applied across bridge rectifier REC–1, filtered by capacitor C1, transient suppressed by capacitor C2 and regulated by transistor Q3, rectifier D1, capacitor C3 and potentiometer P all in a known manner as illustrated.

The remainder of the circuit comprises logic circuitry adapted to produce and operate on two distinct logic levels conventionally designated logic "0" and logic "1". In a preferred form of the invention a high threshold positive logic such as that manufactured by Motorola Corporation under the designation MHTL is utilized. In accordance with this logic system, a "1" represents a positive voltage level greater than 7.5 volts but less than 15 volts and a "0" logic level represents any voltage less than 7.5 volts. In addition, all gates designated by the letter H consist of a plurality of inputs and one output and in accordance with positive logic will produce a logic "0" output only if all inputs are at the logic "1" level. The gates will accordingly be referred to as NAND (NOT AND) gates throughout this specification. It will be appreciated that those NAND gates having only one operative input serve as inverters. Grounded output 82 of power module M1 is effectively at logic "0", the other output 84 being effectively at logic "1". It should be understood, however, that the logic conventions and power supply herein specifically described and illustrated are merely for illustrative purposes only, there being a great many different types of logic circuitry and/or power supplies which could be utilized with the control circuit of the present invention.

Switching circuit 60 receives as inputs lead line 80 from article sensing assembly 20 and the logic "1" source lead line 84 from power module M1. A pair of resistor R2 and R3 are connected to parallel between lead lines 80 and 84, at nodes 86, 88 and 90, 92, respectively.

A capacitor C4 is interposed in lead line 80 between nodes 88 and 92. A first NAND gate H1 is interposed in lead line 80 and has one input connected to node 92 and its output connected to the input of a second NAND gate H2, NAND gate H2 having its output operatively connected to the counter circuit 62. A feedback circuit generally designated 94 comprises a capacitor C5 connected between the output of NAND gate H2 and a second input to NAND gate H1 via a feedback lead line 96. A resistor R4 is connected between lead line 84 and lead line 96 at the second input to NAND gate H2 at nodes 98 and 100, respectively. Capacitors C6 and C7 are each connected between lead line 84 and ground and serve to maintain lead line 84 charged to the logic "1" condition.

Each time a full row of bottles passes the sensor heads, contacts P1–P4 are closed, node 88 is discharged to a logic "0" condition and capacitor C4 is charged through resistor R3 momentarily applying a logic "0" signal to one input of NAND gate H1 at node 92. Accordingly, the output of NAND gate H1 applies a logic "1" signal to NAND gate H2 which in turn produces a logic "0" output. (It will be recalled that a one input NAND gate acts as an inverter.) This logic "0" output is applied to capacitor C5 via feedback lead line 96, and capacitor C5 is thus charged through resistor R4 applying a logic "0" signal to the second input of NAND gate H1 at node 100. As a result NAND gates H1 and H2 are held in this logic condition until capacitor C5 has been charged via resistor R4 to the logic "1" state (approximately one twenty-fifth of a second). Once node 100 has been charged to the logic "1" state the output of NAND gate H1 returns to a logic "0" condition and the output of NAND gate H2 returns to a logic "1" condition. NAND gates H1 and H2 remain in this condition until the next full row of bottles passes the sensing heads.

Accordingly, each time a full row of bottles passes under sensing heads P1–P4 a logic "0" (or negative) pulse of approximately one twenty-fifth of a second duration appears at the output of NAND gate H2. These logic "0" pulses provide the inputs to the counter 62. Counter 62 comprises three flip-flop units generally designated FF1, FF2 and FF3 connected in cascade in the usual manner for counting. Each flip-flop unit generally comprises an RS flip-flop circuit having two transistors with a common base connection. The emitters of both transistors of each flip-flop are grounded and the collectors are connected through appropriate circuitry to a common lead line 102 via lead lines 102a, 102b, 102c, respectively. The two outputs of each flip-flop unit are taken off the collector terminals of its two transistors and are arbitrarily designated the "0" and "1" outputs respectively. That is, a flip-flop unit is considered to be in the "0" state when the transistor whose collector is connected to the "0" output terminal conducts and conversely will be considered to be in the "1" state when the transistor whose collector terminal is connected to the "1" output conducts. The input or trigger terminal T1 of flip-flop unit FF1 is connected to the output of NAND gate H2 via lead line 80. The input or trigger terminal T2 of flip-flop unit FF2 is connected to the "0" output of flip-flop unit FF1 and the input terminal T3 of flip-flop unit FF3 is connected to the "0" output of flip-flop unit FF2. Thus in conventional manner the "0" output of the previous flip-flop provides the carry input to the next flip-flop unit.

In order to et and reset counter 62 for counting, the inputs 102a102b and 102c to flip-flop units FF1, FF2 and FF3, respectively, must be selectively impressed with the logic "1" (to enable for counting) and logic "0" (to reset) signals. For this purpose a lead line 108 is taken off logic "1" source line 84 and a resistor R5 is connected between lead lines 108 and lead line 102 at nodes 112 and 114, respectively. A pair of capacitors C6 and C7 are connected in parallel between node 112 and ground via lead line 117 and serve to maintain node 112 at the logic "1" condition. Accordingly, lead line 102 is normally charged to the logic "1" condition through resistor R5. A lead line 118 is taken off lead line 116 at node 120 between node 114 and resistor R5 and is adapted to be selectively connected to ground (logic "0") at terminal 122 by means of a switch generally designated 124. Switch 124 is shown in FIG. 8 with its contact 125 operatively connected to terminal 122 of lead line 118 and in this position it will be apparent that node 120 and thus lead line 102 is discharged to ground (logic "0") through resistor R5, whereby all flip-flops are reset to "0". When contact 125 is disengaged from terminal 122, lead line 102 is again charged to the logic "1" voltage level through resistor R5. Counter 62 is now ready for counting.

The first negative pulse applied through lead line 80 at the input or trigger terminal of flip-flop unit FF1 will result in the toggle of flip-flop unit FF1 to the "1" state. That is, the transistor whose collector terminal is connected to the "1" output terminal will now be conductive. When the second pulse is applied at the input of flip-flop unit FF1 that unit again toggles this time to the "0" state, and provides a carry output to flip-flop unit FF2 at terminal T2. As a result flip-flop unit FF2 toggles to the "1" state. This procedure continues in the usual manner in accordance with the binary tabulation illustrated in FIG. 10.

Figure 10:
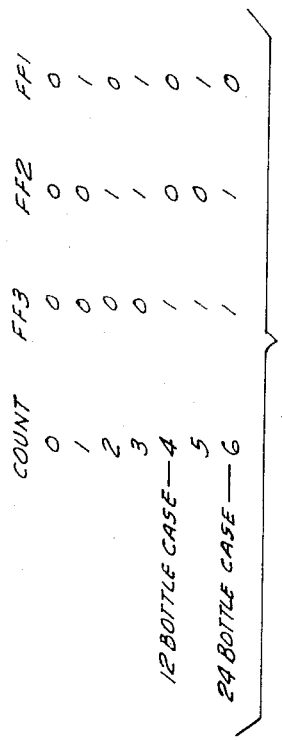
FIG. 10 is a tabulation illustrating the counting operation of the binary counter shown in FIG. 8.

The decoder circuit generally designated 64 is operatively connected to the output terminals of flip-flop units FF1–FF3 and, depending upon the particular unit used, is adapted to respond to a given count registered in the counter. Thus decoder circuit 64 has input terminals designated A, B and C, respectively, said input terminals adapted to be connected to either one or the other of the "1" or "0" output terminals of flip-flop units FF1–FF3, respectively. In accordance with a preferred embodiment of this invention decoder unit 64 comprises a plug-in NAND gate H7 which has three input terminals A, B and C designed to make electrical contact with one each of said two terminals of each flip-flop unit, respectively. The output of decoder 64 is normally at logic "1". When all of the terminals with which input terminals A, B and C are operatively connected are conductive (at logic "1"), decoder 64 will produce an output at the logic "0" state. For example, in the case of a 24-bottle case, a decoder unit 64 will be used which when plugged in makes electrical contact with the "1", "1" and "0" output terminals respectively of flip-flop units FF3, FF2 and FF1 i.e. a "1", "1", "0" decoder). As best shown in FIG. 10 this corresponds to the binary count 6. Accordingly, after 6 complete rows have been counted the output from decoder unit 64 changes from its normal logic "1" level to the logic "0"level. Likewise a "1", "0", "0" decoder would be used with a 12-bottle case.

The output from decoder 64 is impressed upon a lead line 104 which provides one input to NAND gate H3 of logic circuit 66. A second input to NAND gate H3 comprises a grounded lead line 126 having a normally open contact 127 interposed therein. A resistor R6 is connected between lead line 108 and lead line 126 at nodes 125 and 127, respectively.

The output of NAND gate H3 is operatively connected as an input to another NAND gate H4 via lead line 128, NAND gate H4 in turn having its output connected to a third input to NAND gate H3 via lead line 129 at node 130. In accordance with this construction NAND gates H3 and H4 together comprise an RS flip-flop generally designated 131, one gate always being "on" while the other is "off." A second input to NAND gate H4 is operatively connected to the logic "1" source (lead line 84) via node 110, lead line 108, node 132, lead line 134, node 136 and lead line 138. A resistor R7 is connected between the input to NAND gate H4 and node 136 in lead line 138. Lead line 134 is connected to terminal 140 which is a second terminal adapted to be operatively engaged with the contact 125 of switch 124. A resistor R8 is interposed in lead line 134 between node 136 and terminal 140. A capacitor C9 is connected in series with resistor R7 and in parallel with resistor R8 between lead lines 138 and 134 at nodes 148 and 150, respectively. The output of NAND gate H4 at node 130 comprises one input to NAND gate H6, the other input to NAND gate H6 being taken off lead line 134 between resistor R8 and terminal 140 via lead line 152 at node 154. The output of NAND gate H6 is applied via lead line 156 to the single input of NAND gate H5. NAND gate H5 thus serves to invert the output signal from NAND gate H6.

Switch 124 is controlled by the case detect mechanism. The switch is shown in FIG. 8 in its normal position absent a case at the control station. In this condition nodes 150 and 154 (lead line 136) are charged to the logic "1" state via lead lines 108 and 134, node 148 is charged to the logic "1" state via lead lines 108, 134, 138 and resistor R7, and node 114 is maintained in the logic "1" state via lead lines 113 and 126, contact 127 being normally open. Lead line 104 from decoder 64 is maintained at logic "1". Thus inputs 104 and 114 to NAND gate H3 and input 148 to NAND gate H4 are all at logic "1". The RS flip-flop is initially stabilized with the output from NAND gate H3 at logic "1" and the output from NAND gate H4 at logic "0", by momentarily closing normally open contact 127. (As will hereinafter become apparent RS flip-flop 131 under these conditions is stable in either state.) Thus input 130 to NAND gate H6 is at logic "0". However, since input 154 is at logic "1", the output 156 of NAND gate H6 is at logic "1", and output 158 from NAND gate H5 is at logic "0".

When a case reaches the control station, light source 42 is blocked and photoelectric cell 44 is effective to move contact 125 to the dotted line position in FIG. 8. As a result, reset line 102 is now charged to logic "1" through resistor R5, and counter 62 is enabled for counting. In addition, a logic "0" (ground) signal is applied to NAND gate H4 via capacitor C9. This signal is in the form of a pulse, the duration of which depends upon the length of time it takes for capacitor C9 to charge to the positive logic "1" condition through resistor R7 (approximately oneafortieth of a second). This pulse is effective to flip the RS flip-flop to the opposite state; NAND gate H4 produces a logic "1" output which is applied as an input to NAND gate H3, the output of which accordingly changes to a logic "0". Thus input 130 to NAND gate H6 is now at logic "1". However, since the other input 152 to NAND gate H6 is now at logic "0" (it is grounded via switch contact 125) the output 156 of said NAND gate remains at logic "1" and output 158 remains at logic "0".

Each time a full row of bottles passes under the sensor heads P1–P4 a negative or logic "0" pulse is applied to counter 62 via lead line 80, as previously noted, thereby registering a count therein. When the count registered in counter 62 reaches the required number the output from decoder 64 changes from a logic "1" to a logic "0". This logic "0" signal when applied to NAND gate H3 via lead line 104 is effective to flip the RS flip-flop back to its original state. That is, the output 128 of NAND gate H3 changes to logic "1" and the output of NAND gate H4 changes to logic "0". The logic "0" signal at 130 is applied to NAND gate H6. Accordingly, output 156 of NAND gate H6 remains at logic "1" and the output 158 of NAND gate H5 remains at logic "0". As the case passes beyond the control station the electric eye again sees the beam of light emanating from light source 42 and contact 125 is again disengaged from terminal 140 and engaged with terminal 122. Accordingly, nodes 150 and 154 are again charged to the logic "1" state via lead lines 108 and 134 through resistor R8. Input 152 to NAND gate H6 is now in the "1" state. However as a result of the previous flipping of RS flip-flop 131 when the correct count was reached the other input 130 to NAND gate H6 is now in the "0" state. The output from NAND gate H6 thus remains at logic "1" and output 158 from NAND gate H5 remains at logic "0". The alarm accordingly remains unactivated.

If on the other hand the count registered in counter 62 does not reach the required number before the case passes beyond the control station the output from decoder 64 will remain in the logic "1" condition and the following will take place. As the case passes beyond the control station the electric eye 44 again sees the beam of light immediately from light source 42, contact 125 is again disengaged from terminal 140 and engaged with terminal 122, and nodes 150 and 154 are again charged to the logic "1" state via lead lines 108 and 134 through resistor R8. Input 152 to NAND gate H6 is thus in the "1" state. However, because the required count was not reached, thereby maintaining input 104 to NAND gate H3 at the logic "1" condition, the RS flip-flop has remained in its original state with output 128 from NAND gate H3 in the "0" state and output 130 from NAND gate H4 in the "1" state. Thus the two inputs 130 and 152 to NAND gate H6 are now at logic "1" and the output at 156 changes to a logic "0". As a result the output 158 from NAND gate H5 now changes to a logic "1".

As previously noted a logic "1" signal at output 158 is adapted to actuate the alarm by means of indicator actuator circuit 68. For this purpose circuit 68 comprises resistors R10 and R11, transistor Q1 and normally open contact I all connected in series between output 158 and ground. The base of transistor Q1 is operatively connected to the emitter terminal of another transistor Q2 having its collector terminal operatively connected to the collector terminal of transistor Q1 thereby forming a Darlington pair of transistors. The base terminal of transistor Q2 is operatively connected to node 160 between resistors R10 and R11. A resistor R12 and a control relay REL are connected in series with normally closed reset contact 159 and normally closed contact I between the positive voltage source taken off lead line 108 at node 162 and ground. Contact I is controlled by the relay coil REL. The collector terminals of transistors Q1 and Q2 are operatively connected to node 164 between relay REL and contact I and to a node 165 between reset contact 159 and resistor R12 via diode 166. When a logic "1" signal (+15 volts D.C.) is impressed upon output 158, the following takes place. The 15-volt signal is divided by resistors R10 and R11 such that a signal of approximately +2.5 volts D.C. appears at node 160 and is thereby applied to the base terminal of transistor Q2. Transistor Q2 in turn applies a signal of approximately 0.6 volts D.C. to the base of transistor Q1. As transistors Q1 and Q2 saturate, node 164 is discharged to ground via transistor Q1. Current thus flows from the positive source line 84 through lead line 108, node 162, contact 159, resistor R12, relay REL and transistor Q1 to ground. Relay REL is thus energized, locking itself in through its own contact I, and the indicator 70 is actuated.

As previously noted indicator 70 may be in the form of a visible (light) and/or audible (horn, bell, etc.) signal and/or may be effective to eject or shunt the case from the conveyor line. In any event the indicating signal will continue until the reset button 169 is depressed. When this is done contact 159 opens (dotted line position) and current ceases through the relay (REL)-resistor resistor (R12) series circuit. In addition contact 127 is closed (dotted line position) grounding node 114 (at logic "0") whereby the RS flip-flop is flipped back to its initial state (i.e. output 128 from NAND gate H3 is at logic "1" and output 129 from NAND gate H4 is at logic "0"). Thus, output 156 from NAND gate H6 changes to logic "1", output 158 returns to logic "0", and node 160 is again grounded turning off transistors Q1 and Q2. As the reset button is released, node 114 is again charged to logic "1" through resistor R6 and the circuit is ready for the next case. Diode 166 is effective to short out the back emf produced across relay coil REL as it is de-energized.

Figure 9:
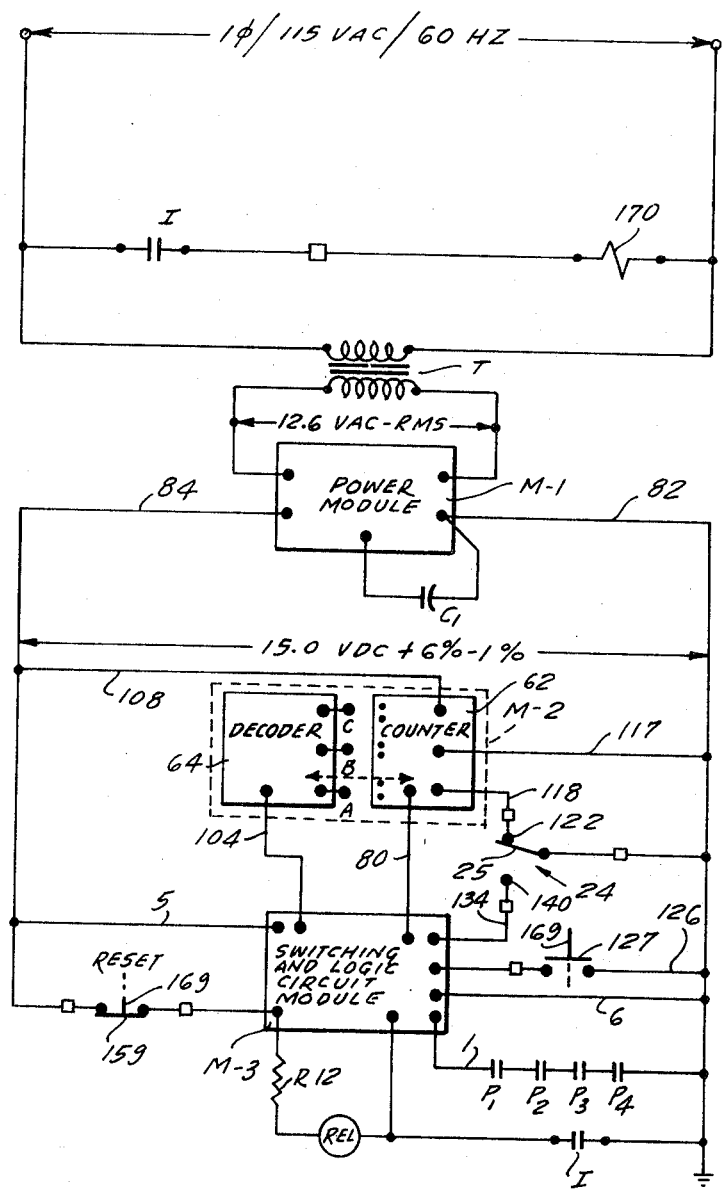
FIG. 9 is a simplified schematic diagram illustrating the modular construction of the control circuit of the present invention.

The foregoing circuitry may be conveniently manufactured and installed in integrated circuit modular form. FIG. 9 is a simplified schematic diagram showing the modular construction of the circuitry of the present invention. As there shown the control circuit comprises a power module M1 corresponding to the like designated power circuitry enclosed in broken lines in FIG. 8, a counter-decoder module generally designated M2 comprising counter 62 and plug-in decoder 64, and a switching and logic circuit module generally designated M3 comprising switching circuit 60 and logic circuit 68. Power module M1 is connected across the secondary of transformer T, the primary of which is adapted to be connected across a standard 115-volt A.C. source. Accordingly 12.6 volts A.C. is produced across the secondary of transformer T and power module M1 is in turn adapted to convert this A.C. potential into a 15-volt D.C. output as previously described. For convenience the interconnecting lead lines of modules M1 through M3 have been designated with like reference numerals as the lead lines of FIG. 8.

For purposes of illustration, a typical indicating device such as a bell or horn 170 is shown connected in series with relay contact I across the 115-volt A.C. standard source. Thus when the relay coil REL is energized contact I closes and current flows through the bell or horn circuit 170 thereby to energize same. In lieu of a manual reset button, contacts 127 and 159 may be adapted for automatic actuation in combination with a particular indicator means effective to appropriately deal with a case having one or more missing bottles. For example, when, in addition to a visible and/or audible alarm, indicator 70 is provided with means to shunt a case off the conveyor track via appropriate mechanical means, limit switches may be appropriately positioned for actuation to momentarily open contact 159 and close contact 127 thereby to automatically reset the circuit via contact 127 and terminate the visible and/or audible alarm via contact 159 when the case has sufficiently cleared the conveyor means.

In accordance with the foregoing, the present invention provides control apparatus and circuitry adapted to rapidly and accurately sense a missing bottle or bottles in cases moving along a shipping line or conveyor means. The apparatus is completely automated and extremely versatile in that it may be readily adapted for use with containers of various sizes and shapes. Moreover, a standardized construction provides for adjustable positioning of the various operative parts so that it can be used in a wide variety of different pre-existing factory installations. The circuitry is readily adapted to provide the required indication of a missing container as a case passes completely beyond the control station so that such case may be appropriately dealt with without undue interference with the control apparatus at the control station.

The circuitry utilizes standard inexpensive commercially available solid state components which may be inexpensively fabricated and installed in integrated circuit modular form. Moreover, the use of a plug-in decoder module adapts the circuit for use with cases of varying capacity. The circuit utilizes exclusively solid state components, thereby eliminating moving parts and increasing reliability. The use of solid state components in addition provides for increased speed of operation.

While only a single preferred embodiment of the present invention is herein specifically described, it will be appreciated that many variations may be made therein all within the scope of the present invention as defined in the following claims.

I claim:

1. In a control apparatus for detecting a missing article in a group of articles passing a control station, having means to detect the presence of said group of articles at said control station and means to detect individual articles of said group passing said control station, an indicating means for indicating the passage of a group of articles having less than said given number of articles, counter means, a switching circuit operatively connected to said article detect means and said counter means and effective each time an article is detected by said article detect means to apply a count signal to said counter means, said counter means being effective to register an additional count for each count signal applied thereto, decoder means having its input operatively connected to said counter means and an output normally at a first logic level, said decoder means being effective upon the registration of a predetermined number in said counter means to produce a signal at its output terminal at a second logic level, logic means having a plurality of input terminals, and an output terminal, a first one of said input terminals being operatively connected to said decoder output terminal, means operatively connected to said group detect means for applying a signal at one of said logic levels to a second one of said input terminals of said logic means during the presence of a group of articles at said control station and at the other of said logic levels during the absence of a group at said control station, said logic means being effective upon application of a signal at said first logic level at said first input terminal and at said other logic level at said second input terminal to produce a missing article signal at its output terminal, and indicator actuating means operatively connected to said indicator means and to said output terminal of said logic means and effective in response to a missing article signal at said logic means output terminal to actuate said indicating means.

2. The control circuit of claim 1, wherein said logic means comprises an RS flip-flop, and a first NAND gate having two input terminals, one of its input terminals being operatively connected to one of the output terminals of said RS flip-flop, and wherein said first input terminal of said logic means comprises one of the input terminals of said RS flip-flop and said second input terminal of said logic means comprises the other input terminal of said NAND gate.

3. The control circuit of claim 2, wherein said RS flip-flop comprises second and third NAND gates having their output terminals connected to the inputs of each other, one input terminal of said second NAND gate being operatively connected to the output terminal of said decoder means and one input terminal of said third NAND gate being operatively connected to said source of said first logic level.

4. The control circuit of claim 3, wherein said signal applying means comprises switch means adapted to connect said other input terminal of said first NAND gate to said source of said second logic level, during the presence of a group at said control station.

5. The control circuit of claim 4, further comprising first resistor means operatively connected between said source of said first logic level and said one input of said third NAND gate, capacitance means operatively connected between said one input of said third NAND gate and said switch means and second resistor means operatively connected in parallel with said capacitance means between said source of said first logic level and said switch means, whereby said switch means is effective upon the entering of a group at said control station to momentarily apply a signal at said second logic level to said one input of said third NAND gate, thereby to flip said RS flip-flop.

6. The control circuit of claim 1, wherein said counter means comprises a binary counter having a plurality of flip-flop units connected in cascade, means effective to enable said flip-flop units for counting, said switching circuit being operatively connected to said first flip-flop unit and effective to apply successive count signals to said first flip-flop unit in response to the passing of said articles at said control station.

7. The control circuit of claim 2, wherein said counter means comprises a binary counter having a plurality of flip-flop units connected in cascade, means effective to enable said flip-flop units for counting, said switching circuit being operatively connected to said first flip-flop unit and effective to apply successive count signals to said first flip-flop unit in response to the passing of said articles at said control station.

8. The control circuit of claim 3, wherein said counter means comprises a binary counter having a plurality of flip-flop units connected in cascade, means effective to enable said flip-flop units for counting, said switching circuit being operatively connected to said first flip-flop unit and effective to apply successive count signals to said first flip-flop unit in response to the passing of said articles at said control station.

9. The control circuit of claim 4, wherein said counter means comprises a binary counter having a plurality of flip-flop units connected in cascade, means effective to enable said flip-flop units for counting, said switching circuit being operatively connected to said first flip-flop unit and effective to apply successive count signals to said first flip-flop unit in response to the passing of said articles at said control station.

10. The control circuit of claim 5, wherein said counter means comprises a binary counter having a plurality of flip-flop units connected in cascade, means effective to enable said flip-flop units for counting, said switching circuit being operatively connected to said first flip-flop unit and effective to apply successive count signals to said first flip-flop unit in response to the passing of said articles at said control station.

11. The control circuit of claim 2, further comprising inverter means having its input connected to the output of said first NAND gate and having its output terminal operatively connected to said indicator actuating means.

12. The control circuit of claim 5, further comprising inverter means having its input connected to the output of said first NAND gate and having its output terminal operatively connected to said indicator actuating means.

13. The control circuit of claim 7, further comprising inverter means having its input connected to the output of said first NAND gate and having its output terminal operatively connected to said indicator actuating means.

14. The control circuit of claim 11, wherein said indicator actuating means comprises a power supply, relay means, a switching device operatively connected to said relay means and adapted to be controlled thereby, means operatively connected to said logic means for actuating said relay means in response to a missing article signal thereby to render said switching device conductive, said indicator means being connected in series with said switching device across said power supply.

15. In a control apparatus for detecting a missing article in a group of articles passing a control station, means having an output normally at a first logic level for detecting the presence of said group of articles at said control station and effective during the presence of said group at said control station to produce an output signal at a second logic level, to to detect individual articles of said group passing said control station, indicating means for indicating the passage of a group of articles having less than said given number of articles, counter means, a switching circuit operatively connected to said article detect means and said counter means and effective each time an article is detected by said article detect means to apply a count signal to said counter means, said counter means being effective to register an additional count for each count signal applied thereto, decoder means having its input operatively connected to said counter means and an output normally at one of said first or second logic levels, said decoder means being effective upon the registration of a predetermined number in said counter means to produce a signal at its output terminal at the other of said first or second logic levels, logic means operatively connected to said decoder output, said indicating means, and said group detect means and effective upon the operative coincidence of a signal at said first logic level at the output of said group detect means and a signal at the other of said first and second logic levels at the output of said decoder means, to actuate said indicating means.

16. In a control apparatus for detecting a missing article in a group of articles passing a control station, means to detect the presence or absence of said group of articles at said control station and effective to produce a logic signal responsive thereto, means to detect individual articles of said group passing said control station, indicating means for indicating the passage of a group of articles having less than said given number of articles, counter means operatively connected to said article detect means and adapted to register counts in response to the detecting of said articles by said article detect means, decoder means having its input operatively connected to said counter means and an output normally at a first logic level, said decoder means being effective upon the registration of a predetermined number in said counter means to produce a signal at its output terminal at a second logic level, logic means operatively connected to said decoder output, said indicating means and said case detect means and effective upon the passage of a group beyond said control station to actuate said indicating means if said decoder output is at said first logic level, said decoder means and said counter means being provided with mating terminals whereby said decoder may be operatively connected to and disconnected from said counter means without the use of external leads.

* * * * *